5 Sheets—Sheet 1.

H. BERDAN.

Bake Oven.

No. 1,035.

Reissued Sept. 11, 1860.

5 Sheets—Sheet 2.

H. BERDAN.

Bake Oven.

No. 1,035. Reissued Sept. 11, 1860.

H. BERDAN.
Bake Oven.
No. 1,035. Reissued Sept. 11, 1860.
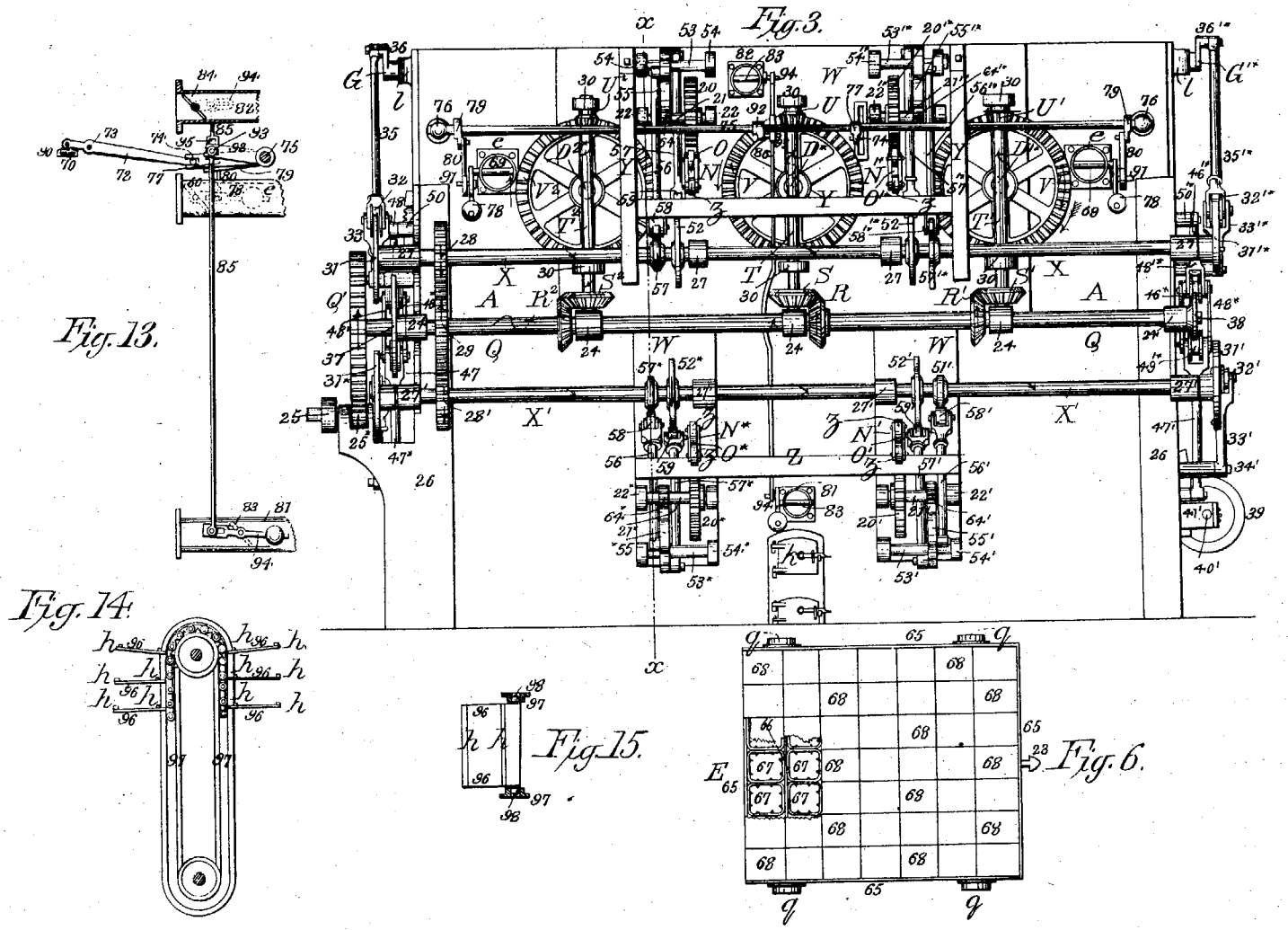

5 Sheets—Sheet 4.

H. BERDAN.

Bake Oven.

No. 1,035.

Reissued Sept. 11, 1860.

5 Sheets—Sheet 5.

H. BERDAN.

Bake Oven.

No. 1,035. Reissued Sept. 11, 1860.

UNITED STATES PATENT OFFICE.

HIRAM BERDAN, OF NEW YORK, N. Y.

IMPROVEMENT IN BAKERS' OVENS.

Specification forming part of Letters Patent No. 18,429, dated October 20, 1857; Reissue No. 1,035, dated September 11, 1860.

*To all whom it may concern:*

Be it known that I, HIRAM BERDAN, of the city, county, and State of New York, have invented certain new and useful Improvements in Bakers' Ovens and in the Method of Baking Bread and other Similar Matters; and I do hereby declare that the following is a full, clear, and exact description thereof, reference being made to the accompanying drawings, making part of this specification, in which—

Figure 1:
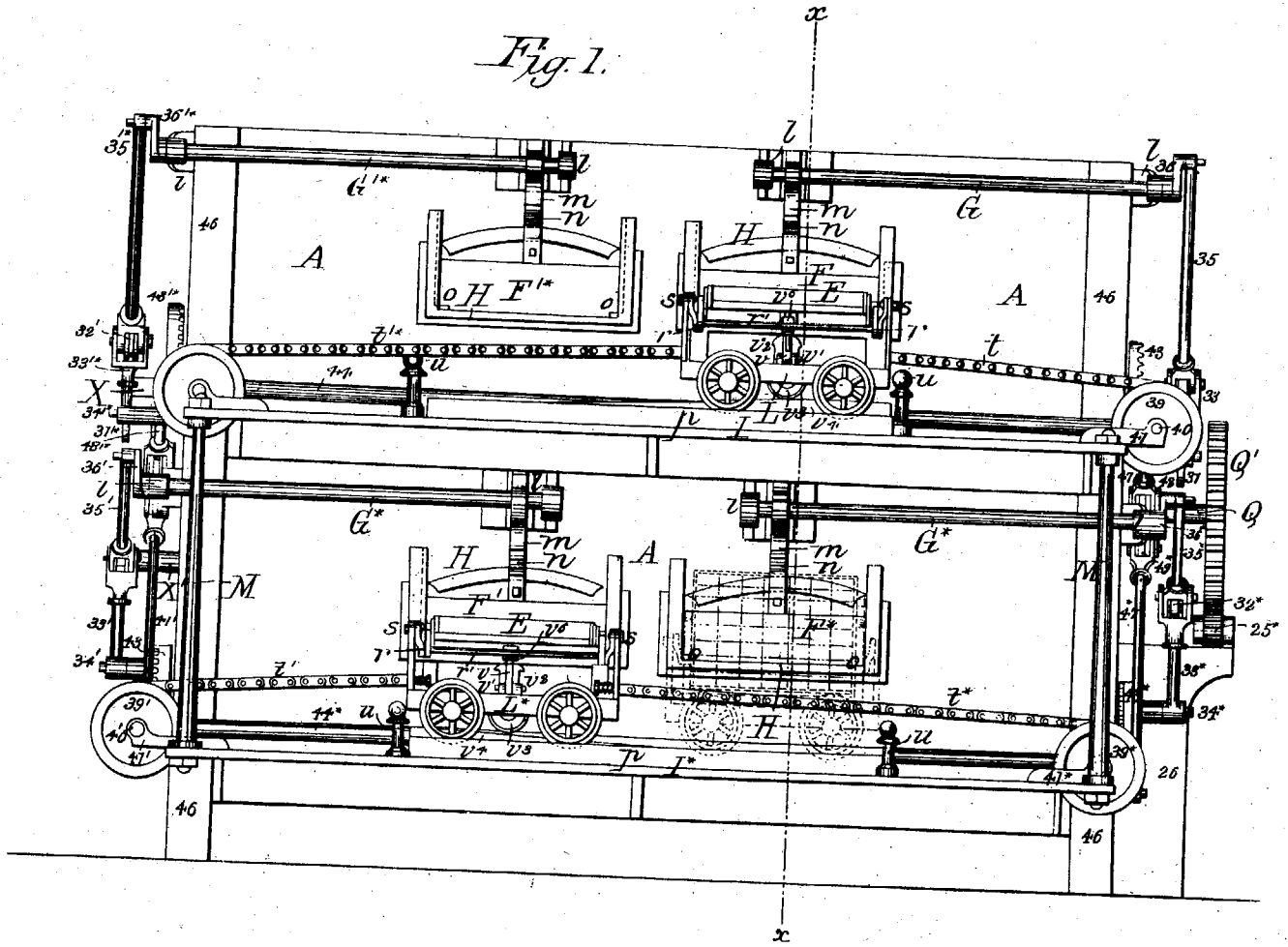
Figures 2, 10:
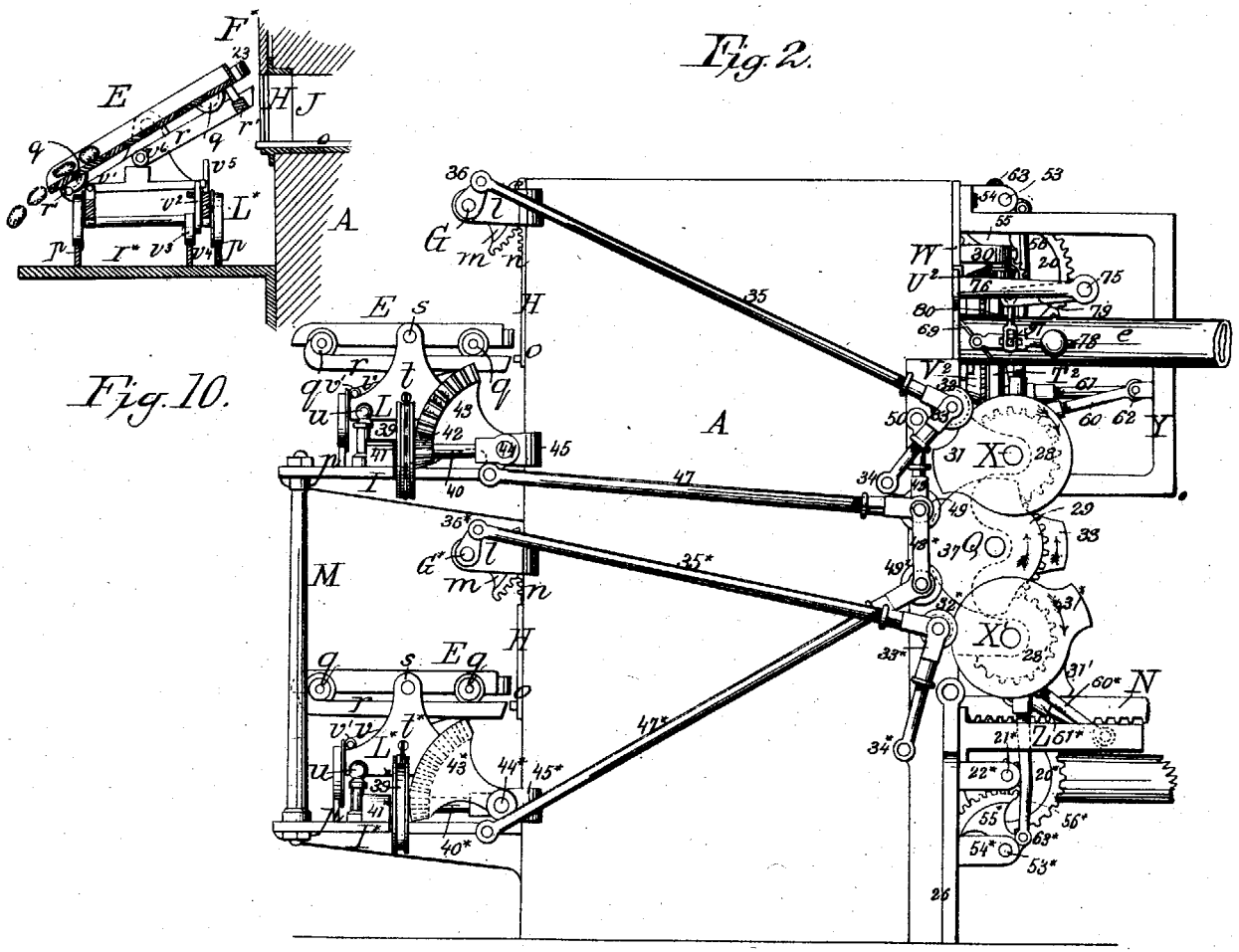
Figure 4:
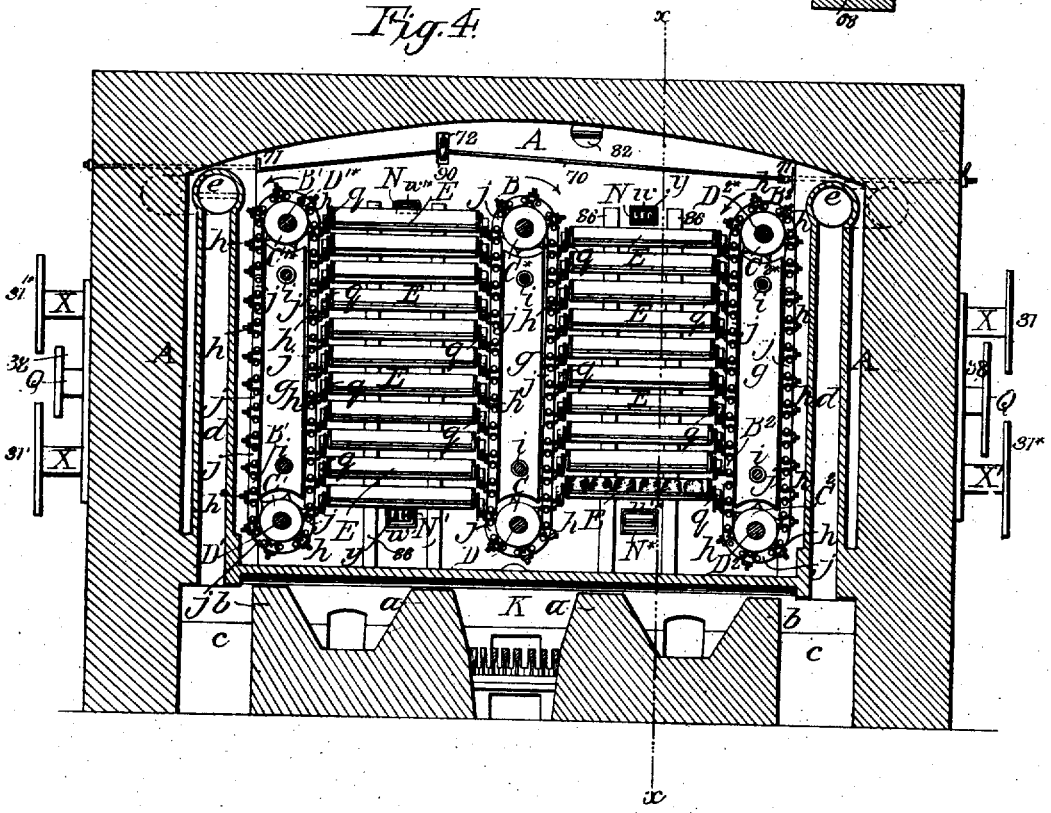
Figure 5:
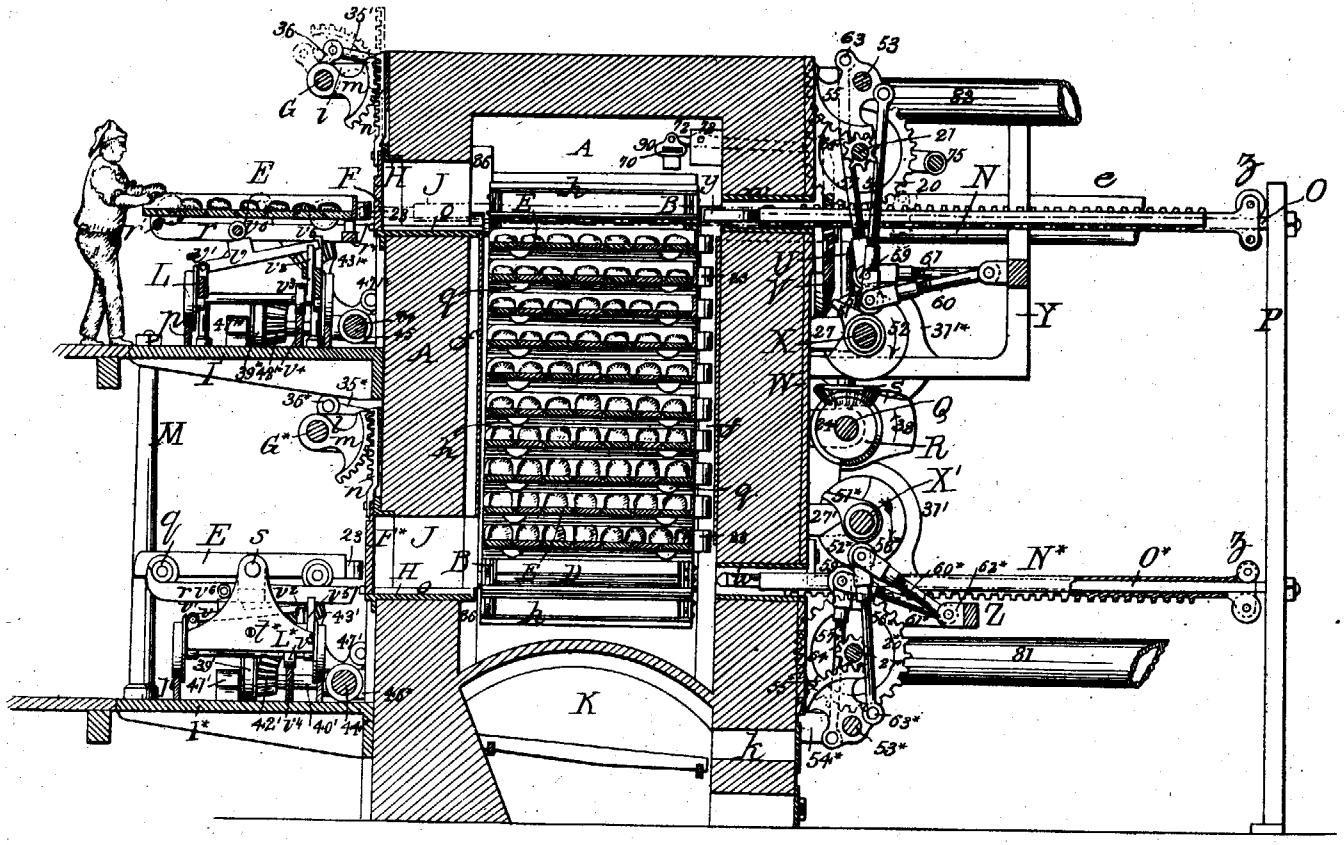

Figures 1, 2, and 3 are front, end, and back elevations, respectively, of an oven constructed according to my invention. Fig. 4 is a vertical section on a plane parallel with that shown in Fig. 1. Fig. 5 is a like section on the line *x x* of Figs. 1, 2, and 3.

The other figures are of parts in detail fully referred to herein, and similar letters and numbers indicate similar parts throughout the figures.

Previously to the date of my invention there had been no means devised for performing successfully all the operations connected with the "setting and drawing" of the bread without handling in some part of the process, although attempts have from time to time been made to accomplish it. Three plans are known to me as having been proposed for doing some portion of the work by mechanical aid, though not approaching the principles of automatic performance, as mine does. An oven of extended length has been used, having endless chains passing over drums situated at opposite ends, and on which were fixed platforms for supporting loaves, which were thus carried through the oven by the onward motion of the chains, the dough being placed upon the platform through an opening at one end, thence were conveyed to the other end, and there dumped off as the platform passed around the drum to return, the loaves falling into a trough or chute, and thus became self-delivered. Another plan was a high oven, in which revolved a large wheel, from the rim of which depended swinging platforms, thus kept level in all positions of the wheel. The bread was neither "set" nor "drawn" by this device by mechanical means. A third plan was an oven, above the bottom of which a large circular plate was suspended so as to revolve horizontally. In this dough was set on and baked bread removed therefrom by hand as the loaves were carried past the opening made in the side of the oven for that purpose.

By my improvement in the method of baking bread, &c, I am enabled to retain all the advantages of the usual low and bread oven, while at the same time I can accomplish, within the ground space required for an oven of ordinary character, the baking of a very much greater quantity in the same time, with much less cost for labor as well as for fuel. I am also certain of producing a better article, since all of the loaves remain precisely the same length of time in the oven, and this length can be graduated to the exact requirements of the case.

My invention may properly be divided into two parts, and the nature of the first part consists in the employment, in combination with the oven, of a system of detached platforms or cars so arranged and so operated by suitable mechanism that the "setting" and the "drawing" of the bread will be effected automatically.

The nature of the second part consists in the arrangement of the cars or platforms while in the oven in vertical tiers, and in the manner in which they are moved through the oven, whereby the proper application of the heat to the bread is effected, as well as the transferring of the bread into and out of the oven.

One manner in which my said invention may be carried out will now be described.

At A is shown an oven built of brick-work, strengthened with iron plates, and having upright sides, an arched roof, and an arched bottom. It has also a fire-place, K, under the bottom, said fire-place having bridge-walls *a* and *b* on each side, over which the products of combustion pass under the entire bottom of the oven to the two main horizontal flues *c*, whence they pass through a number of upright fire-clay pipes, *d*, which line the sides of the oven, and communicate with two horizontal main flues, *e*, close to the roof, and intended to enter a connecting-flue outside the oven, which flue communicates directly with the chimney.

At *k* is the fire door, at the back of the oven.

Figure 11:
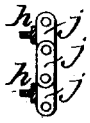
Figure 12:
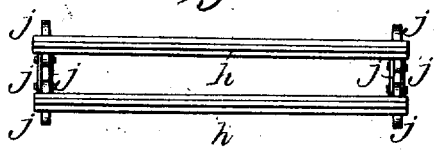

At B B′ B² are three pairs of upright endless chains within the oven, fitted to run on sprocket-wheels C C* C′ C′* $C^2$ $C^{2*}$, which are secured on three pairs of parallel horizontal shafts, D D* D′ D′* $D^2$ $D^{2*}$, fitted to rotate in suitable bearings in plates *f*, which are secured to the front and back of the interior of the oven, the said plates being strengthened by stays *i*. (See Fig. 4.) One pair, D D*, of said shafts is arranged with their axes in a vertical plane passing through the center of the oven, one shaft being near the top and the other near the bottom of the oven. The other two pairs have their axes arranged in vertical planes at equal distances from the central pair on opposite sides thereof near the ends of the oven and at corresponding elevations, as shown in Fig. 4. Each pair of shafts carries on its four sprocket-wheels one pair of endless chains, and the chains and sprocket-wheels are arranged nearly close to the back and front of the oven, as is shown in Fig. 5. The endless chains are kept in upright positions between their respective sprocket-wheels by means of upright projections *g*, Fig. 4, on the two plates *f*, which projections enter and fit easily between the sides of the chains. The two endless chains which constitute one pair—that is to say, the two which are hung on the same pair of shafts—are connected together at equal distances by horizontal bars *h*, bolted to or cast with alternate links *j* of the two chains, as shown in Figs. 4, 11, and 12. The bars *h*, which it will be observed are on the outer faces of the chains, constitute tracks, extending from the front to the back of the oven, to support cars E, on which the bread or other article to be baked is run into and from the oven and supported while in the oven undergoing the baking process. One side of each car is supported by a bar, *h*, on the straight portion of the central pair of chains, B, and the other by a like bar on the straight portion of one of the side chains, B′ or $B^2$. The shafts of the chains are so geared that each bar *h* on the straight portions of the central pair of chains, B—that is to say, the portions that are free of the sprocket-wheels—is exactly on the same level as a bar of the nearest side of the nearest outer pair of chains, B′ or $B^2$, so as to support the cars in a perfectly-horizontal position, as is illustrated in Fig. 4. The distances between the several bars *h*, taken vertically, is only just such as will be sufficient to allow the heat of the oven to enter properly between the cars which are upon said rails. For cars of, say, four feet in width a distance of about twelve inches will be found suitable. The chains have severally a continuous motion in such direction (indicated by arrows in Fig. 4) that the cars supported by the chains B $B^2$ are always descending and those supported by the chains B B′ always ascending. The plates *f*, which line the back and front of the oven, are furnished with upright projecting pieces 86, the faces of which serve to guide the ends of the cars in their ascent and descent.

At F F* F′ F′* are four vertically-sliding doors, fitted to openings in front of the oven, said openings being of a height and width sufficient for the cars E, when loaded with bread or other material, to pass to and from the oven, two of said openings, having the doors F and F*, being situated opposite the space between the chains B and $B^2$, and the other two, F′ and F′*, opposite the space between the chains B and B′. The two openings belonging to the doors F′ and F′* are on the same level with each other, or nearly so, near the bottom of the straight portions of the chains. The bottoms of the door-frames H in the openings J are provided with raised tracks *o*, (see Fig. 5,) corresponding in distance apart and position with the tracks *h* for the wheels *g* of the cars E to run on into and from the oven. The doors F and F′ admit the cars to the oven with the unbaked bread, and those F* F′* serve for their exit with bread after it is baked. The velocity of the movement of the chains should be such that the time occupied by the several cars in their movement from the door F to the door F* or from the door F′ to the door F′* will be just sufficient for the baking process.

At G G* G′ G′* are four horizontal shafts, working in brackets *l*, secured to the front of the oven, one of the said shafts being situated above each of the four doors, and each carrying a toothed sector, *m*, gearing with an upright toothed rack *n*, attached to its respective door for the purpose of opening and closing the door by proper movements imparted to the shafts, in the manner hereinafter described, at proper intervals of time for the entrance and exit of the cars as the track-bars *h* severally arrive on a level with the bottom of the openings.

At I I* are two iron platforms, situated in front of the oven at such distance below the openings J as is convenient for men standing upon said platforms to fill the cars when the latter are supported at a proper level to run into the oven. These platforms are staid together by pillars M, and have upon them tracks *p*, parallel with the front of the oven, (see Figs. 1, 2, and 5,) along which tracks travel wheeled carriages L L*, upon which the cars E are received as they leave the oven by the discharging-doors F* F′*, and by which the cars, after having been unloaded, are conveyed to positions opposite the receiving-doors F F′, to be in readiness to enter the oven again when the latter doors are opened at the proper time. The movements of the carriages along said tracks are effected by the agency of chains *t t** *t′ t′**, Fig. 1, operated as hereinafter described, said movements being limited by stationary stops *u*. Each of the carriages L L* is provided with a tilting-frame, *r r′*, the side rails, *r*, of which, when the carriage is opposite one of the doors, form continuations of the tracks *o* and of any of the tracks *h* that may happen to be at the right level, so that the cars may run from the oven directly onto the rails *r*, or vice versa.

Those ends of the rails $r$ which are farthest from the oven are turned up, as shown in Figs. 2 and 5, to stop the wheels $q$ when the cars have run far enough out of the oven to allow the doors to close. The lilting-frame $r$ of each of the carriages L L* is balanced on two pivots, $s$, which are supported in the ends of the carriage, but it is so arranged that when a loaded car is received upon it from the oven its outer end shall be overbalanced by the weight of the car, and it, with the car upon it, shall be caused to assume an inclined position, so that the baked bread, &c., will slide off the car into a suitable receptacle, while the car is retained upon the rails $r$ by the turned-up ends of said rails. This operation of the tilting-frame is illustrated in Fig. 10, which represents a vertical section of the discharging-door F*, with the carriage L* opposite to it, the latter having received a car which has just tilted, and thus been caused to discharge its bread, &c. The same carriage is represented in the same condition in red outline in Fig. 1. The tilting frame $r$ $r'$ of each carriage is returned to a horizontal position while the carriage is on its way from the discharging to the receiving door by means of a lever, $v$, of the second order, Figs. 1, 5, and 10, which lever is attached at one end by a fulcrum-pin, $v'$, to that side of the body of the carriage that is farthest from the oven and which has its other end supported in a notch in an upright sliding piece, $v^2$, working in a guide attached to that side of the body of the carriage that is nearest to the oven. This piece $v^2$ has a wheel, $v^3$, attached to it, which runs on a rail, $v^4$, between the rails $p$, said rail $v^4$ having an upward inclination from the discharging toward the receiving door, as shown in Fig. 1. An anti-friction roller, $v^6$, is attached to the tilting-frame in a position between its pivots $s$ and its outer end as shown in Fig. 5. When the carriage is opposite the discharging-door, the wheel $v^3$ of the sliding-piece $v^2$, being at the bottom of the inclination of the rail $v^4$, allows the sliding piece to occupy a low position relatively to the tilting-frame, and the lever $v$ hangs low enough to allow the tilting-frame to come to the inclined position shown in Fig. 10, but as the carriage runs toward the receiving-door the wheel $v^3$, in running up the inclined fence of the rail $v^4$ causes the sliding piece $v^2$ to lift the lever $v$ gradually, and said lever, coming in contact with the roller $v^6$, raises the outer end of the tilting-frame and replaces it in a horizontal position, holding it in that position, with the car upon it, opposite the receiving-door, in readiness to be reloaded and run into the oven at the proper time. When the tilting-frame is in a horizontal position, the end nearest the oven has a bearing upon a rest, $v^5$, attached to the carriage. The loading of the cars may be performed by hand, as is represented in Fig. 5.

At $w$ is an aperture in the back of the oven opposite the door F to admit a pair of spring-tongs, $y$, attached to a long horizontal iron bar, N, which is fitted with rollers Z, to run upon a stationary horizontal bar, O, which is attached at its front end to the back of the oven and supported at its rear end by an upright frame, P. (See Fig. 5.) This bar N is furnished with a toothed rack gearing with a spur-wheel, 20, on a short horizontal shaft, 21, arranged in suitable bearings in brackets 22, forming parts of a large casting, W, secured to the back of the oven, said shaft being operated at proper intervals to cause the spur-wheel to act upon the rack and drive the bar N quickly through the oven every time a pair of rails, $h$, of the chains arrives on a level with the tracks $o$ inside the door F. This is for the purpose of seizing hold of the loaded car of unbaked bread that is at the time waiting opposite the said door, and the bar is to return as quickly, drawing the said car along the tracks $o$ and $h$ into the oven.

Figure 8:
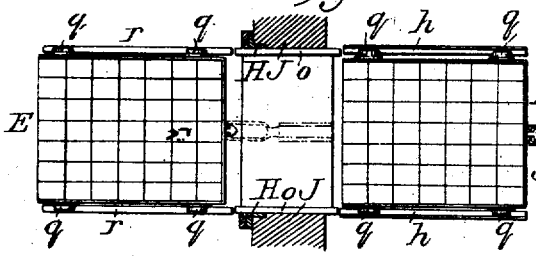

The operation of the bar N and tongs $y$ is shown in Figs. 5 and 8, the latter of which figures exhibits a horizontal section of the aperture J and the door F and a plan of the bar N, one of the cars being inside the oven and another outside. The stationary position occupied by the bar N and tongs $y$, after having drawn a car into the oven and while in waiting to run through the oven when the proper time arrives to bring in another car, is represented in Figs. 5 and 8, their position at the time of just having seized a car being shown in the duplicate lines. The tongs have latches at their extremities, which take onto a double hook, 23, affixed on the back of each car. After the car has been drawn into the oven it is liberated from the tongs by its descent with the chains, while the bar and tongs remain in the position shown in black outline until the car has moved entirely below the tongs, the latter being then at liberty to run in to seize another car at the proper time.

At $w'$ is a like aperture in the back of the oven, opposite the door F, to admit a pair of spring-tongs, $y'$, attached to a bar, N', similar to and operated substantially as the bar N and tongs, $y$, to bring the cars through the doors F' on the ascending tracks $h$ of the chains B B', the hooks 23 of these cars liberating themselves from the tongs $y'$ by an upward instead of a downward motion.

At 21' is the shaft, and 20' the spur-gear by which the bar N' is driven into and out of the oven, said shaft being hung also in brackets 22' on the casting W.

At $w^*$ is an aperture in the back of the oven opposite the door F* to admit a bar N*, which is provided with a broad T-shaped end, and runs on a bar, O*, that is similarly arranged, to O and O', said bar N* being for the purpose of pushing out the cars E through the open door F* as the descending tracks $h$ of the chains B severally arrive at a proper level. The bar N* is driven through and drawn back out of the oven in a similar manner to the bars N and N' by means of a spur-wheel, 20*, on a short horizontal shaft, supported in brackets 22* on the casting W, the said spur-wheel 20* gearing into a rack on the under side of the bar.

At $w'$* is another aperture in the back of the oven, situated opposite the door F'* and serving to admit a bar, N'*, like N*, fitted to run on a bar, O'*, that is similarly arranged to O O' O*, and being for the purpose of pushing the cars through the open door F'* as they are severally brought to a proper height by the ascending movement of the chains B B'. The bar N'* is driven through the oven for the above purpose and drawn back again in a similar manner to N*.

Figure 9:
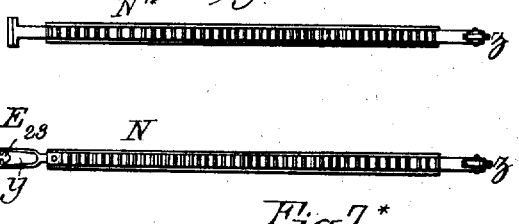
Figure 7:
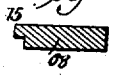

Fig. 9 represents a plan of the bar N'*, and also serves to illustrate the form of the bar N', as that only differs from N'* in having its toothed rack on the under side. The bars N' N* N'* are, like N, all provided with rollers Z Z to run on their guide-bars. All these bars are shown in the back view of the oven, Fig. 3, the frame P being omitted to expose the driving mechanism by which the movements of the chains, doors, cars, and carriages are effected.

At Q is the main driving-shaft, from which the movements of all the machinery are derived. It is supported in a horizontal position in brackets 24 on the casting W, and has a rotary motion at a slow speed imparted to it. This main shaft, through a train of bevel-wheels and shafts, as R R' $R^2$, S S' $S^2$, T T' $T^2$, U U' $U^2$, V V' $V^2$, imparts motion to the chains B B' $B^2$.

At X is a shaft, arranged above and parallel with the main shaft Q, and receiving rotary motion from and at the same velocity as that through the spur-wheels 28 and 29. This shaft X is furnished at one end (seen to the left hand of Fig. 3 and right hand of Fig. 1) with a cam, 31, the form of which is visible in Fig. 2, and which rotates in contact with a roller, 32, (see Figs. 2 and 3,) at the end of an arm, 33, fitted to swing on a pivot, 34, and which is connected by a rod, 35, with a short arm, 36, that is fast on the end of the shaft G. This cam gives the necessary movement to the shaft G for the sector $m$, by its action on the rack $n$, to open the oven-door E at the proper time for the rod N, with its tongs $y$, to run forward and draw a loaded car from the carriage L into the oven. The cam only keeps the door open long enough to admit the car. The door closes again by its own weight and that of its moving parts, all of which are so disposed as to make the roller descend the off-set of the cam. At the opposite end of the same shaft X there is a similar cam, 31'*, which operates in like manner upon a roller, 32'*, attached to an arm, 33'*, (see Fig. 3,) which swings on a pivot, 34, and connected by a rod, 35'*, with an arm, 36'*, on the shaft G'*, being arranged like those just above described as being operated upon by the cam 31, and causing the shaft G'* to open the door F'* at the proper time for a car of baked bread to be pushed by the rod N'* out of the oven onto the carriage L.

At X' is a shaft like X, arranged below and parallel with the main shaft Q, and receiving motion at the same speed as the main shaft Q through the spur-wheels 28' and 29. This shaft is furnished at one end with a cam, 31*, (see Figs. 2 and 3,) and operating, like the cam 31, through a roller, arm, &c., to give the necessary movement of the shaft G* to cause the door F* to be opened at the proper time to allow the bar N* to push out a car of baked bread from the oven onto the carriage L*. At the opposite end of this shaft X' there is a cam, 31', which operates also in a similar manner to cam 31, to give the shaft G' the movement necessary for opening the door F at the proper time for the bar N' with its tongs $y'$ to pull a loaded car from the carriage L* into the oven.

All the cams above described are of such form and so arranged, and the doors are also so arranged, that one door is closed before another is opened, and only one is allowed to be opened at a time, and thus no drafts of cold air can be induced through the oven by the opening of the doors. The doors open in the following order—F F' F'* F*. The shaft Q carries also two cams, 37 and 38—the former near that end of the said shaft seen to the left hand of Fig. 3, and the latter at that end seen to the right hand of the same figure. These cams are for the purpose of transmitting motion to the chains $t$ $t$* $t'$ $t'$* for the purpose of moving the carriages L L* to convey the cars from the discharging-doors F* F'* to the receiving-doors F' F. The mechanism through which motion is transmitted from these cams is as follows: The two chains $t$ $t'$* which are connected with the carriage L, are respectively attached to two wheels, 39 and 39'*, upon two shafts, 40 and 40', which are arranged in bearings 41 41*, supported by the platform I, and these shafts carry two bevel wheels, 42 42'*, which gear with two bevel-toothed sectors, 43 43'*, on a long horizontal rock-shaft, 44, which is arranged parallel with the front of the oven just above the platform I in brackets, 45 45, attached to the two front corner plates, 46 46, of the oven. The sector 43 is connected by a rod, 47, with an arm, 48, (see Figs. 2 and 3,) which hangs on a fixed pin, 50, secured in one of the back corner plates, 26, and carries at its lower end a roller, 49, which rests against the cam 37, and the sector 43'* is connected similarly to that, 43, by a rod, 47'*, with an arm, 48'*, (see Fig. 3,) which carries a roller, 49'*, resting against the cam 38. The forms of the two cams 37 38 and the arrangement of the several parts of the mechanism above described are such that the two sectors are operated upon by their respective cams to move both shafts, 40 40'*, in similar directions, so that as one of the chain-wheels 39 or 39'* winds up its respective chain, $t$ or $t'$*, the other lets off its respective chain, and the forms of the two cams and their arrangement upon the shaft Q are such that through the operation of the mechanism above described upon the chains $t$ $t'$* the carriage L is caused to arrive opposite the door F'* just before that door opens, and after a car of baked bread has been run out onto the said carriage the latter is almost immediately run along its track $p$ to the door F, where it remains stationary till the latter door has opened and the bar N, with its tongs $y$, has drawn the car into the oven. The time that the car remains stationary opposite the latter door is sufficient for the car to be loaded by an attendant. The two chains $t$* $t'$ are by a similar train connected with the carriage L*, and these give a similar motion to that carriage—that is to say, to bring the said carriage at the proper time opposite the discharging-door F* to receive a car of baked bread from the oven and then to run the said carriage across to the receiving-door F' and keep it stationary in front thereof till its car has been reloaded and run into the oven again through the latter door. The shaft X carries also other cams, 51 52 51'* 52'*, for the purpose of giving the necessary motion to the shafts 21 21'*, before described, by which the bars N N'* are operated to draw the cars into and eject them from the oven through the doors F F'*. The shaft X' carries similar cams, 51* 52* 51' 52', for the purpose of giving the necessary motion to the shafts 20* 21' by which the bars N* N' are operated to draw the cars into and eject them from the oven through the doors F* F'.

The arrangement and operation of the mechanism through which the cams 51 52 act upon the shaft 21 will now be described, and as the mechanism through which the other similar cams operate is exactly the same it will merely be necessary to describe the one.

Above the shaft 21 there is a rock-shaft, 53, working in bearings attached to the casting W, said rock-shaft carrying a toothed sector, 55, Figs. 3 and 5, gearing with a small spur-wheel, 64, on shaft 21. This toothed sector has connected to it by wrist-pins 63, on opposite sides of its shafts, two rods, 56 57, to the lower end of which are attached two rollers, 58 59, one of which rests on the cam 51 and the other on the cam 52. The cam 51, acting upon the roller 58 and rod 56, moves the sector 55 in the proper direction for it to turn the wheel 64, and consequently the shaft 21, in the direction required for its wheel 20, acting upon the rack of the bar N, to drive said bar forward through the oven; and the cam 52, acting in like manner in the proper direction for it to turn the wheel 64, and consequently the shaft 21 and wheel 20 in the opposite direction, to draw back the bar and draw back a car into the oven. The relative forms of the two cams 51 52 are such that they hold the sector steady whether in motion or at rest, neither cam allowing the sector to move any faster than the other requires.

The cars E may be constructed variously to suit the different articles to be baked thereon. I prefer to make the bottoms of soapstone or tiles of fire-clay, although iron will be found to answer very well.

Figure 7:
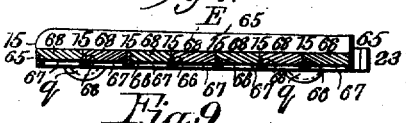

The construction of the bodies of the cars is illustrated in Figs. 6, 7, and 7*, the first of which figures is a plan and the next a longitudinal section of one of the cars on an enlarged scale.

At 65 is a quadrangular cast-iron frame, constituting the sides, front, and back of the car-body, and strengthened by transverse bars 66, said transverse bars being of the same depth as the front of the car, but of a much less depth than the back and sides of the car, as shown in Fig. 7.

At 67 are a number of small square frames of light wrought-iron, fitting between the bars 66, as shown in Fig. 6, where some of the tiles are omitted or broken away to expose the said frame. These frames 67 are of a depth only about one-half that of the bars 66 to which they are so secured as to leave about one-half the depth of the latter standing above them, as shown in Fig. 7. The tiles 68 are made of the same size as the exteriors of the frames 67, but each with a lip, 15, Fig. 7*, on one side, to lap over and rest each on one of the bars 66, while the four sides of the tile are supported by the frames 67. The two sides and back of the frame 65 of the car stand up some distance above the tile bottom, which not only strengthens the car, but prevents the loaves or other articles slipping off in any direction except at the front, where the frame is covered by the tiles, and no obstruction is offered to the slipping off of the loaves or other articles when either of the carriages L L* is tilted with the car upon it.

By the above construction of the cars not only is provision made for their discharging themselves, but the tiles, which form a close, flat bottom, are also confined securely in place, and if one or more should happen to be accidentally broken, the whole ones cannot be so far displaced as to fall out.

Instead of cars on wheels, trays constructed in a substantially similar manner, and sliding into and from the ovens, might be used, but generally the cars will be more convenient than sliding trays.

In order to provide for the regulating of the temperature of the oven, and to economize fuel, each of the outlet-flues may be fitted with a "butter-fly" damper, 69, Figs. 2, 3, and 5, made self-acting by the following means: 70 is a thin flat bar of iron or other metal, (see Figs. 4 and 5,) extending across the upper part of the oven, and firmly secured at its ends by bolts 71 to the ends of the oven. This bar is longer than the distance between the points of attachment of its ends, and has to be deflected to get it into its place, such deflection being made in an upward direction from its ends. This deflection will be increased more or less by the expansion of the bar when the oven becomes hot. At its highest part the bar 70 passes through a slot in a link, 90, suspended from the front end of a lever, 72, which works through a hole in the back of the oven on a fulcrum, 73. This lever and its connections with the damper are represented detached from the oven in Fig. 13, which is a side view. The outer or rear end of this lever carries a stud, 74, on one side, (see Fig. 5,) which stud works in the forked end of an arm, 77, secured to a light horizontal shaft, 75, which is fitted to turn in brackets 76, Figs. 2 and 3, secured to the back of the oven. This shaft 75 carries near the flues *e* two other arms, 79, each of which has suspended from it a rod, 80, in which there is a slot to receive a stud, 91, secured in one of two weighted levers, 78, of the third order, one of which is affixed to the spindle of each of the "butterfly" dampers 69. The weights on the levers 78 exert a tendency to close the dampers 69, but as the studs 91 of the said levers cannot move below the bottom of the slots in the rods 80, the closing of the dampers is controlled by the arms 79 of the shaft 75, from which the said rods are suspended, and the position of these arms 79 depends on the degree of deflection of the expansion bar 70. The arms 79 are so adjusted that when the oven is at the lowest baking temperature the dampers 69 are wide open; then, as the temperature increases beyond this point, the increasing deflection of the bar 70, consequent upon its expansion, causes the said bar to raise the inner end of the lever 72, by which means the stud 74 at the outer end thereof, is caused to depress the arm 77 and turn the shaft 75 in such direction that the arms 79 allow the descent of the weighted damper-levers 78. As soon as these levers descend the dampers begin to close, and this operation continues as the heat of the oven continues to increase until the dampers are entirely closed. As the temperature falls again an opposite effect is produced, the bar 70 straightening again as it contracts.

The above regulating apparatus can be so adjusted as to close the dampers entirely at any given temperature, but whenever the amount of dough in the oven is materially lessened the temperature may continue to rise after the communication from the fire to the chimney is closed, and therefore a pipe, 81, Figs. 3, 4, 5, and 13, leading into the lower part of the back of the oven, and a pipe, 82, communicating between the upper part of the oven and the chimney, are provided for the admission of upward currents of cold air through the oven to the chimney, which admission is effected by the opening of a damper in each of these pipes, the opening of the said dampers being performed by the action of an arm, 92, secured on the shaft 75, and provided with a stud, 93, that works in a slot, 95, in a rod, 85, which connects two levers, 94, attached one to each of the spindles of the two dampers 83 84. The lower one of these levers—viz., that belonging to the damper 83—is weigted in such manner as to exert a tendency to close the two dampers, and there is so much play allowed in the slot 95 for the stud 93 that the whole of the movement of the shaft 75, necessary to open and close the flue-dampers 69, can be effected without any movement of the rod 85; but the continued movement of the shaft 75 produced by the continued expansion of the bar 70, after the dampers 69, have been closed, brings the stud 93 to the bottom of slot 95, and causes the depression of the rod 85 and of the ends of levers 94 that are attached to said rod, thus opening the dampers 83 84 and admitting a stream of air through the oven.

The operation generally will be as follows: A full series of the cars being within the oven, but empty, and the heat having been raised to the desired degree, on starting the main driving-shaft the last car of each series will be run out at its appropriate door and at once transferred to a position in front of its corresponding entrance-door. Here it will remain stationary for a fixed space of time, but which will be sufficient for the attendant to cover its surface with loaves of the dough, the cars forming the vertical series within the oven being during that time moving on one place. The door will then be opened, the car drawn in, and the door closed, and while being so drawn in the last car of the series is being transferred to a tier which is moving in an opposite direction in order that it may be brought again to the level of an entrance-door. The last of that series is then driven out, the driving-bar withdrawn, and the door closed. The series of cars within the oven is now caused to move on again to a distance proper for the reception of another car, being the distance from the bottom line of one to that of the next car. During this time the car which has just emerged from the oven is made to tilt and discharge its bread, to resume its level position, and to take its place at an entrance-door, ready to be filled and drawn in as before described. The position of the several cars in the tier C with regard to each other—viz., that each car is directly over another car, and is also in close proximity to that other car—effects the protecting or screening of the bread against the too-rapid heating of the surface of the loaves, because there is thus always a surface above the loaves, which is also an absorbent of the heat, and, as the distance between the cars is so little, the bottom of each does not acquire the full temperature due to that radiated from the top and sides of the oven until it has been for some little time in the oven.

It will be apparent that a variety of devices may be resorted to whereby the proper moving of the cars through the oven may be accomplished, though I prefer the system of endless chains, as herein described; and it will also be obvious that numerous variations may be made in the order in which the cars are received into, carried through, and brought out of the oven—for instance, the cars may be caused to enter at a lower door, then be carried up vertically, transferred at the top of that series to another vertical series located beyond instead of at the side of the first series, again returned to the level from which it started, and there be either run out at a rear door, or, if desired, at the door at which it entered. If run out an opposite door, the oven might still be automatic in its operations by having two such sets of cars and moving apparatus placed side by side, and then by the use of the railway, &c., above described, the car which had just emerged from the oven would, after tilting, be conveyed to the door of the next set, there to be refilled, enter, pass through, and emerge again at the front. This arrangement would obviate the necessity of having doors on different levels.

I claim—

1. The method of "setting" and "drawing" bread, &c., substantially as herein set forth—namely, by means of cars or detached platforms made to move into and out of the oven automatically, in the manner described.

2. The method of baking bread, &c., substantially as herein described—that is to say, by the employment, in combination with an oven, of cars or detached platforms so arranged and supported that while in the oven they shall be conveyed in vertical tiers through the same and shall be made to move horizontally into and out of the said oven.

3. Transferring each car as it arrives successively at the end of its series to a tier or series which is moving in an opposite direction, whereby said cars may readily be operated automatically both while in the oven and while entering and emerging from the same.

H. BERDAN.

Witnesses:
J. P. PIRSSON,
S. H. MAYNARD.